United States Patent
Liao et al.

(10) Patent No.: US 10,298,705 B2
(45) Date of Patent: May 21, 2019

(54) RECOMMENDATION METHOD AND DEVICE

(71) Applicant: Alibaba Group Holding Limited, Grand Cayman (KY)

(72) Inventors: Chuang Liao, Hangzhou (CN); Chao Yang, Hangzhou (CN); Na Ni, Hangzhou (CN); Zhongyi Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 207 days.

(21) Appl. No.: 15/352,310

(22) Filed: Nov. 15, 2016

(65) Prior Publication Data

US 2017/0142209 A1 May 18, 2017

(30) Foreign Application Priority Data

Nov. 17, 2015 (CN) .......................... 2015 1 0788738

(51) Int. Cl.
*G06F 15/173* (2006.01)
*H04L 29/08* (2006.01)

(52) U.S. Cl.
CPC .............. *H04L 67/22* (2013.01); *H04L 29/08* (2013.01); *H04L 67/16* (2013.01); *H04L 67/306* (2013.01)

(58) Field of Classification Search
CPC ....... H04L 67/16; H04L 67/22; H04L 67/025; H04L 67/306; H04L 29/08
See application file for complete search history.

(56) References Cited

U.S. PATENT DOCUMENTS 6,868,389 B1 3/2005 Wilkins et al.
7,120,629 B1 * 10/2006 Seibel ............... G06F 17/30613
(Continued)

FOREIGN PATENT DOCUMENTS

CN 104111959 A 10/2014

OTHER PUBLICATIONS

International Preliminary Report on Patentability to corresponding International Application No. PCT/US16/62141 dated May 31, 2018 (8 pages).
(Continued)

*Primary Examiner* — Razu A Miah
(74) *Attorney, Agent, or Firm* — James J. DeCarlo; Greenberg Traurig, LLP

(57) ABSTRACT

Disclosed is a recommendation method and device. The method comprises acquiring a user's Internet service sequence, a user preference vector for Internet services, and an attribute vector for Internet services identified in the user's Internet service sequence each of the foregoing based on user network behavior data generated when the user accesses the Internet services; calculating user preference scores for one or more candidate Internet service providers, wherein the user preferences scores are calculated based on the user's Internet service sequence, the user preference vector for the Internet services, the attribute vector for the Internet services, and Internet service lists provided by the candidate Internet service providers; and sending a recommendation of potential users to the candidate Internet service providers based on the user preference scores for the candidate Internet service providers. The present disclosure can recommend more high-quality potential users to Internet service providers, to increase user subscription.

17 Claims, 4 Drawing Sheets

(56) References Cited

U.S. PATENT DOCUMENTS

| | | | |
|---|---|---|---|
| 7,991,841 B2 | 8/2011 | Anderson et al. | |
| 8,229,780 B2 | 7/2012 | Davidow et al. | |
| 8,326,663 B2 | 12/2012 | Christon et al. | |
| 9,026,521 B1 | 5/2015 | Daniel | |
| 9,189,798 B2 | 11/2015 | Title et al. | |
| 2001/0051876 A1* | 12/2001 | Seigel | G06F 17/3087 705/26.1 |
| 2004/0243459 A1 | 12/2004 | Geritz, III et al. | |
| 2005/0154648 A1 | 7/2005 | Strause | |
| 2007/0236453 A1* | 10/2007 | Maynard | G06F 17/2211 345/158 |
| 2007/0255614 A1 | 11/2007 | Ourednik et al. | |
| 2008/0288361 A1 | 11/2008 | Rego et al. | |
| 2009/0076995 A1* | 3/2009 | Uyama | G06Q 30/02 706/46 |
| 2009/0112989 A1 | 4/2009 | Anderson et al. | |
| 2010/0114493 A1* | 5/2010 | Vestal | E21B 41/00 702/9 |
| 2010/0205261 A1* | 8/2010 | Michel | H04N 7/17318 709/206 |
| 2011/0010366 A1 | 1/2011 | Varshavsky et al. | |
| 2011/0131224 A1* | 6/2011 | Bodin | G06Q 30/02 707/758 |
| 2011/0276396 A1* | 11/2011 | Rathod | G06F 17/30867 705/14.49 |
| 2011/0295997 A1 | 12/2011 | Priyadarshan et al. | |
| 2012/0066234 A1* | 3/2012 | Lee | G06F 17/30867 707/749 |
| 2012/0198056 A1 | 8/2012 | Shama et al. | |
| 2012/0265610 A1 | 10/2012 | Shama et al. | |
| 2013/0036181 A1* | 2/2013 | Choi | H04L 67/16 709/206 |
| 2013/0097017 A1 | 4/2013 | Shenoy et al. | |
| 2013/0125157 A1* | 5/2013 | Sharif-Ahmadi | G06F 17/30017 725/14 |
| 2013/0138475 A1* | 5/2013 | Allison | G06Q 30/0201 705/7.29 |
| 2013/0159413 A1* | 6/2013 | Davis | H04L 29/0872 709/204 |
| 2013/0232183 A1* | 9/2013 | Lee | H04L 67/10 709/201 |
| 2013/0238435 A1 | 9/2013 | Barak et al. | |
| 2013/0262214 A1* | 10/2013 | Baird | G06Q 30/0207 705/14.33 |
| 2013/0317895 A1* | 11/2013 | Turner | G06Q 30/0207 705/14.16 |
| 2014/0067972 A1* | 3/2014 | Kageyama | H04L 51/32 709/206 |
| 2014/0278807 A1* | 9/2014 | Bohacek | G06Q 30/0206 705/7.35 |
| 2014/0344217 A1 | 11/2014 | Title et al. | |
| 2014/0358638 A1 | 12/2014 | Sukumar | |
| 2015/0039539 A1* | 2/2015 | Shivashankar | G06N 5/02 706/12 |
| 2015/0046458 A1 | 2/2015 | Hu | |
| 2015/0127628 A1* | 5/2015 | Rathod | H04W 4/21 707/710 |
| 2015/0339727 A1* | 11/2015 | Yi | H04L 67/22 705/14.45 |
| 2016/0189203 A1 | 6/2016 | Rajab et al. | |

OTHER PUBLICATIONS

International Search Report and Written Opinion to corresponding International Application No. PCT/US16/62141 dated Feb. 7, 2017.

* cited by examiner

RECOMMENDATION METHOD AND DEVICE

CROSS-REFERENCE TO RELATED APPLICATIONS

This application claims the benefit of priority of Chinese Application No. 201510788738.3, titled "Method and Apparatus for Making Recommendations," filed on Nov. 17, 2015, which is hereby incorporated by reference in its entirety.

BACKGROUND

Field of the Disclosure

The present disclosure relates to the field of Internet technology, and more particularly involves a recommendation method and device.

Description of Related Art

With the development of Internet technology, users can obtain increasingly more Internet services from websites. In the process of users browsing websites to select Internet services, a website recommendation system plays an important role and especially targets those users who do not have clear demands, as they may directly select Internet services recommended by the website recommendation system. Currently, websites have their own recommendation system for recommending Internet services to users.

The typical technique of recommending potential users to Internet service providers is to select users who have had direct behavior dealings (such as clicking, browsing, or purchasing) with the Internet services provided by the Internet service providers and recommend potential users to the Internet service providers. However, the number of users recommended by this typical method is often limited and the user coverage rate is relatively low.

BRIEF SUMMARY

The present disclosure provides a recommendation method and device used for recommending more high-quality potential users to Internet service providers, so as to increase user subscription.

One aspect of the present disclosure provides a method for recommending users to an Internet service provider, comprising acquiring a user's Internet service sequence, a user preference vector for Internet services, and an attribute vector for Internet services identified in the user's Internet service sequence wherein the user's Internet service sequence, the user preference vector, and the attribute vector are based on user network behavior data generated when the user accesses the Internet services in a network system; calculating user preference scores for one or more candidate Internet service providers, wherein the user preferences scores are calculated based on the user's Internet service sequence, the user preference vector for the Internet services, the attribute vector for the Internet services, and Internet service lists provided by the Internet service providers; and sending a recommendation of potential users to the candidate Internet service providers based on the user preference scores for the candidate Internet service providers.

Another aspect of the present disclosure provides a recommendation device, comprising: a vector acquisition module or logic, used for acquiring a user's Internet service sequence, a user preference vector for Internet services and an attribute vector for Internet services identified in the user's Internet service sequence wherein the user's Internet service sequence, the user preference vector, and the attribute vector are based on user network behavior data for the Internet services in a network system; a score acquisition module or logic, used for calculating user preference scores for one or more candidate Internet service providers, wherein the user preferences scores are calculated based on the user's Internet service sequence, the user preference vector for the Internet services, the attribute vector for the Internet services, and Internet service lists provided by the Internet service providers; and a recommendation module or logic, used for sending a recommendation of potential users to the candidate Internet service providers based on the user preference scores for the candidate Internet service providers.

In the present disclosure, the user's Internet service sequence, the user preference vector for the Internet services, and the attribute vector for the Internet services in the Internet service sequence are acquired according to the user network behavior data generated when the user accesses Internet services in the network system within a specific time range. Then, the user preference scores for the candidate Internet service providers are acquired according to the user's Internet service sequence, the user preference vector for the Internet services, the attribute vector for the Internet services and the Internet service lists provided by the candidate Internet service providers, wherein any user preference score for the candidate Internet service provider can be calculated. In one embodiment, this is not limited to users who have had network behavior dealings with the Internet services provided by the candidate Internet service providers. Next, potential users are recommended to the candidate Internet service providers according to the user preference scores for the Internet service providers, so as to ensure the quality of the recommended users. It is thus evident that the present disclosure can recommend more high-quality potential users to the Internet service providers, so as to increase user subscription.

BRIEF DESCRIPTION OF THE DRAWINGS

Described drawings herein are used for providing further understanding for the present disclosure and constitute a portion of the present application. Exemplary embodiments and descriptions thereof of the present disclosure intend to explain the present disclosure rather than improperly limiting the present disclosure.

DETAILED DESCRIPTION

Figure 1:
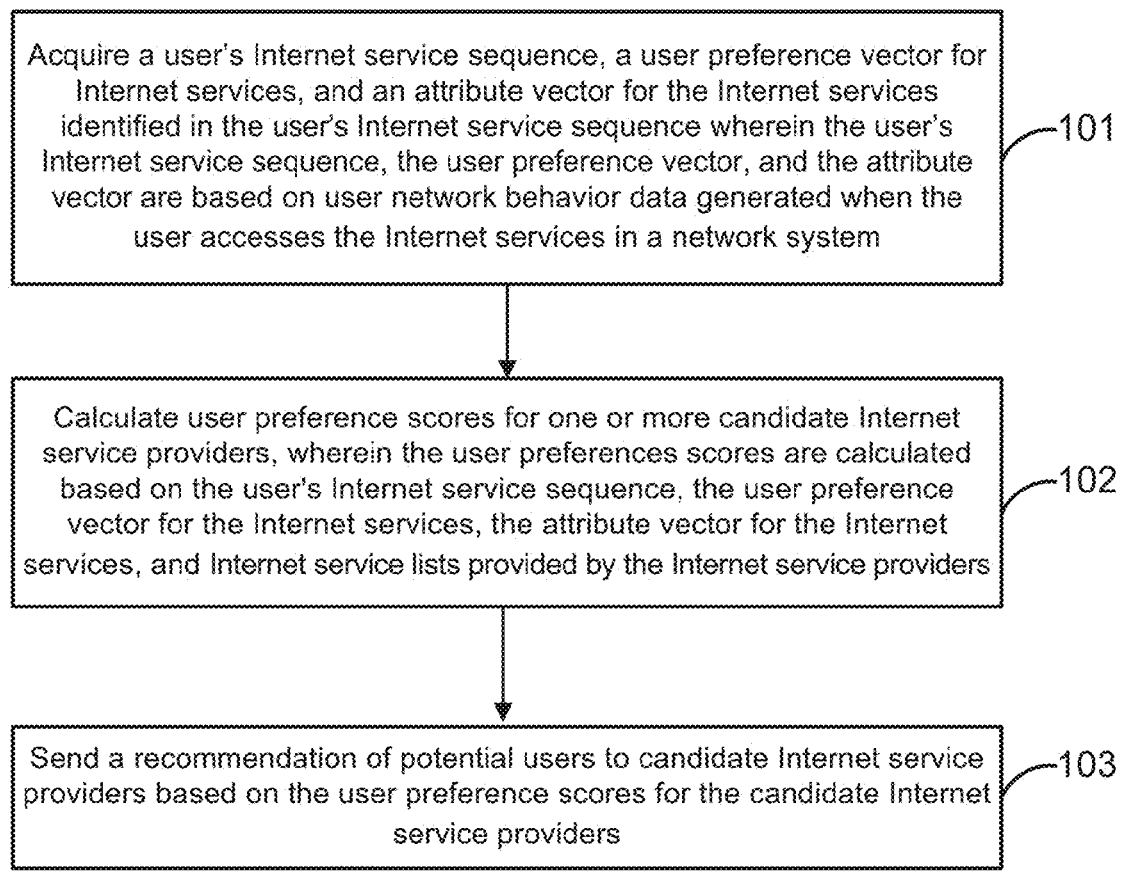
FIG. 1 illustrates a flow diagram of a method for recommending Internet service providers to a user according to one embodiment of the disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

FIG. 1 illustrates a flow diagram of the recommendation method provided in an embodiment of the present disclosure.

In step 101, the method acquires a user's Internet service sequence, a user preference vector for Internet services, and an attribute vector for Internet services identified in the user's Internet service sequence wherein the user's Internet service sequence, the user preference vector, and the attribute vector are based on user behavior data generated when the user accesses Internet services in the network system;

In step 102, the method calculates user preference scores for the one or more candidate Internet service providers, wherein the user preferences scores are calculated based on the user's Internet service sequence, the user preference vector for the Internet services, the attribute vector for the Internet services, and Internet service lists provided by the Internet service providers. In one embodiment, the candidate Internet service providers may be selected from a list of Internet service providers providing Internet services selected from one or more Internet service lists provided by the Internet service providers.

In step 103, the method sends a recommendation of potential users to the candidate Internet service providers based on the user preference scores for the candidate Internet service providers.

The method illustrated in FIG. 1 may be implemented by a recommendation device to recommend more high-quality potential users to Internet service providers, so as to promote the popularization and application of Internet services provided by the Internet service providers. The method provided by this embodiment can be used for any Internet-based application requiring user recommendations.

For example, when an online store releases commodities on an e-commerce website, the e-commerce website can adopt the method illustrated in FIG. 1 to receive recommendations of potential users (e.g., buyers) to the online store. As another example, when a video resource supplier uploads a video resource on a resource downloading website, the resource downloading website can receive recommendations of potential downloading users. As another example, when a take-out provider (e.g., restaurant) provides take-out service via a take-out client (e.g., a mobile application), the take-out client can receive recommendations of potential customers.

According to different embodiments, the network systems, the users in the network systems, the network behaviors of the users, and the Internet services may be different. The illustrated embodiments do not specify the implementation of the network systems, the users in the network systems, the network behaviors of the users, and the Internet services. For example, the network system can be a network system based on e-commerce websites. In this example, the Internet services in the network system may be shopping services, for example, where commodities are provided via the network system for users to purchase. The network behaviors of users in the network system can include one or more of the actions of browsing, bookmarking, adding to a shopping cart, purchasing, paying, and commenting.

As another example, the network system can be a network system based on resource downloading websites. Correspondingly, the Internet services in the network system can be resource downloading services, for example, where audio, video, or text resources can be downloaded. The network behaviors of users in the network system can include one or more of the actions of previewing, downloading, playing, etc. Additionally, the Internet services may also be car wash services, online booking services, maintenance services, massaging services, cleaning services, in-house chef services, housekeeping services, tutoring service, entertainment services, food and drink services, travel services, hotel services, car rental service, and other similar services.

From the above examples, the Internet services provided in this embodiment refer to the services provided to the users via the network, and can be services in application-specific fields such as e-commerce, e-government, and the electronic business processes of a company. Accordingly, the Internet service suppliers are referred to as Internet service providers. Taking the Internet service of shopping service as an example, the Internet service provider can be an online store or merchant providing commodities.

It is worthwhile to note that the recommended device used for implementing the method illustrated in FIG. 1 can be implemented as a functional module for both a website or a client, or can be independent of the website or client, but can communicate with both the website or client, so as to cooperate with the website or client to complete the recommendation.

To better promote or market the Internet services provided, the Internet service providers generally conduct service promotions or utilize marketing strategies with respect to their own user groups. The user groups of the Internet service providers not only include the existing users, but also include some potential users. As for the Internet service providers, they usually need to identify more high-quality potential users. The methods illustrated in this disclosure can recommend more high-quality potential users to the Internet service providers.

In one embodiment, potential users can be recommended to any Internet service provider in the network system. In order to facilitate description and distinction, the following example of the recommending potential users to one of the Internet service providers is provided, wherein the Internet service provider is referred to as the "candidate" Internet service provider. The candidate Internet service provider can be any Internet service provider in the network system.

In order to recommend more high-quality potential users to the candidate Internet service provider, unlike in the prior art, the scope of recommending users is not limited to users who have had prior, behavioral dealings with the network services provided by the candidate Internet service provider. Rather, the users are recommended from any user groups in the network system, so as to increase the number of the potential users recommended. In other words, the users include those who have not been associated with or have not had any direct network behavior associated with the candidate Internet service provider. In another embodiment, the users in the present disclosure can also include those who have been associated with or have had direct network behavior associated with the candidate Internet service provider. For recommending potential users to the candidate Internet service provider from any user groups in the network system, the illustrated embodiments calculate the preference score of any user for the candidate Internet service provider, then make recommendations based on the user preference score for the candidate Internet service provider. Furthermore, the illustrated embodiments define conditions for calculating the user preference score for the candidate Internet service provider by vectorizing the user network behaviors and Internet services in the network system, so that the calculation of user preference score for the candidate Internet service provider is no longer restricted. Then, any user preference score for any Internet service provider can be calculated based on the vectorized results, further recommending potential users to the Internet service provider on the basis of the user preference score for the Internet service provider.

In one embodiment, the recommendation device can recommend potential users according to the requests of the Internet service provider, and can recommend potential users to the Internet service provider periodically, or recommend by combining these two methods.

In one embodiment, when potential users are to be recommended to the candidate Internet service provider, for example, when a preset recommendation cycle has been reached or when recommendation requests from the candidate Internet service provider have been received, the recommendation device can obtain log data of the network system in the designated time range, from which the network behavior data generated by the users for the Internet services in the network system within a specific time range can be obtained. For example, when accessing the Internet services within a specific time range, the network behavior data generated by the users includes the data generated by clicking, browsing, purchasing, bookmarking and other network behaviors of the users for the Internet services within a specific time range, such as a user ID, network behavior type, network behavior occurrence time, identification of Internet service, Internet service attributes, terminal type of the user, and terminal identification of the user.

Considering that the network behavior data is, in one embodiment, generated continuously in the network system, and that the effects of historical network behavior data will likely be weakened as time progresses, this embodiment selects the network behavior data within a certain time range, which can be flexibly set according to the requirements of the Internet service provider and the scenario. For instance, the time range can be the most recent month, the most recent week or the most recent day or few (e.g., three) days.

In one embodiment, the recommendation device can obtain any user network behavior data generated for the Internet services in the network system within a specific time range. The recommendation method provided in this embodiment does not specify the number of the users. Preferably, the network behavior data of each user in the network system within a specific time range is selected.

Figure 2:
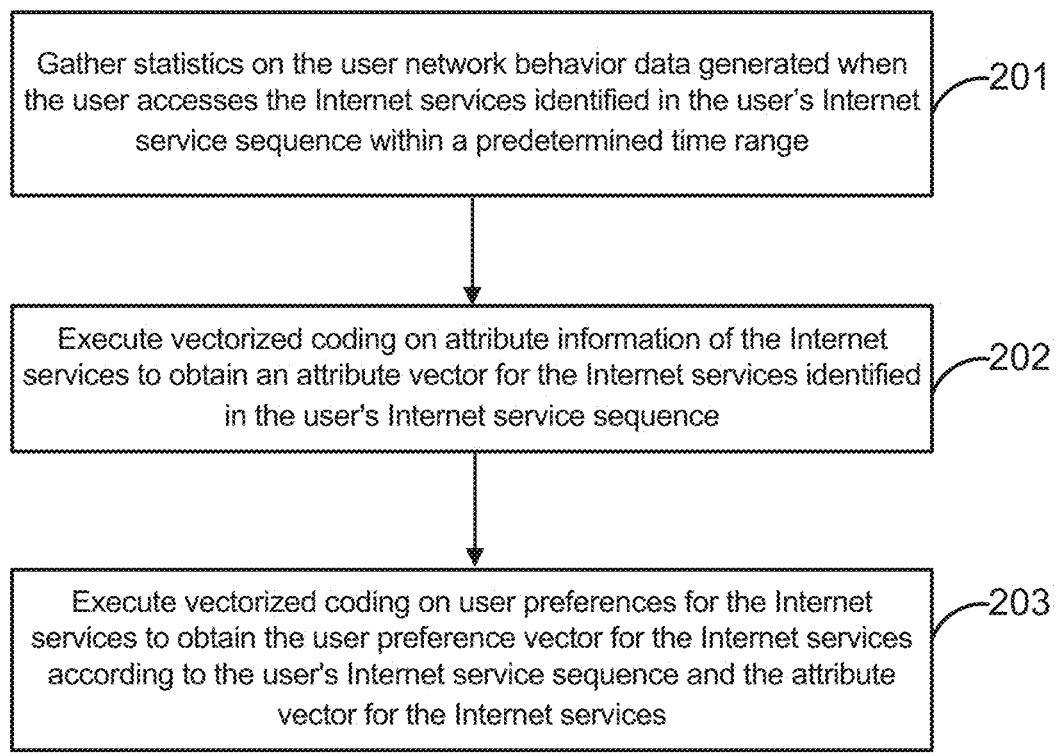
FIG. 2 illustrates a flow diagram of a method for recommending Internet service providers to a user according to one embodiment of the disclosure.

In one embodiment, acquiring the user's Internet service sequence, user preference vector for the Internet services, and the attribute vector for the Internet services identified in the Internet service sequence may be performed by the method illustrated in FIG. 2.

As illustrated in FIG. 2, after obtaining the user network behavior data for the Internet services within a specific time range, in step 201, the method gathers statistics on user network behavior data generated for the Internet services within a specific time range, so as to obtain the user's Internet service sequence according to the time sequence of network behavior occurrences. For example, if the user $u_1$ has had network behavior dealings with $n_1$ Internet services within a specific time range, then the $u_1$ Internet service sequence of the user can be represented as $u_1=\{w_1, w_2, \ldots, w_{n1}\}$; the user $u_2$ has had network behavior dealings with $n_2$ Internet services within a specific time range, then the $u_2$ Internet service sequence of the user can be represented as $u_2=\{w_1, w_2, \ldots, w_{n2}\}$; the user $u_m$ has had network behavior dealings with $n_m$ Internet services within a specific time range, then the $u_m$ Internet service sequence of the user can be represented as $u_m=\{w_1, w_2, \ldots, w_{nm}\}$. Wherein, w represents the Internet service that the user has had network behavior dealings within a specific time range and the subscript of w represents the number of Internet services.

In step 202, the method executes vectorized coding on attribute information of the Internet services to obtain the attribute vector for the Internet services according to the user's Internet service sequence. It is worthwhile to note that a user may have had network behavior dealings with several Internet services, and many users may have had network behavior dealings with the same Internet service. Thus, a given Internet service may be included in the Internet service sequences of many users who have had network behavior dealings with the various Internet services. Thus, vectorized coding can be carried out on the attribute information of the Internet services to obtain the attribute vector for the Internet services according to the Internet service sequences of all users who have had network behavior dealings with the Internet services.

In one embodiment, the following formula (1) can be used as the optimization objective. Vectorized coding is carried out on the attribute information of the Internet services to obtain the attribute vector for the Internet services, with the goal of maximizing the value of formula (1).

$$\prod_{w \in C} p(w \mid context(w)) \tag{1}$$

In the above formula (1), w represents an Internet service in the user's Internet service sequence; and context(w) represents the context of the Internet service w in the user's Internet service sequence. Wherein, the distance between the left side and the Internet service w, designated as the first designated distance, and the distance between the right side and the Internet service w, designated as the second designated distance, constitute the context of the Internet service w. The first and the second designated distances can be the same or different. For example, the first designated distance can be 0, 1, 2, and the second designated distance can be 0, 1, 2, or 3, etc. Preferably, the first and the second distances are not 0 at the same time. p(w|context(w)) represents the conditional probability of the Internet service w; C represents a set of Internet service sequences that includes the Internet service in the user's Internet service sequence w. For instance, Google open-source word2vec can be applied to carry out vectorized coding on the attribute information of the Internet services. Alternatively, embedding coding can be carried out on the attribute information of the Internet services based on the linguistic model of the neural network. The objective function of embedding is the above formula (1).

In step 203, the method executes vectorized coding on the user preferences of the Internet services to obtain the user preference vector for the Internet services according to the user's Internet service sequence and the attribute vector for the Internet services.

Specifically, a user indicates a preference when the user has had a network behavior dealing with the Internet service, such as clicking on the Internet service. This represents the user's network preference degree for the Internet service. The interest model of the user for the Internet service can be obtained via the user's Internet service sequence, i.e. the preference vector of the user for Internet services.

The equation, $$p(u, \overrightarrow{item_{uj}}) = \sigma(\vec{u}, \overrightarrow{item_{uj}}) = \frac{1}{1 + e^{-u^T item_{uj}}},$$

can be obtained through the linear transformation (sigmod) of the inner product of the user preference vector for the Internet services and the attribute vector for the Internet services. This formula can represent the preference degree of the user for the Internet services. Wherein, $p(u, item_{uj})$ represents the preference degree of the user for the j Internet service in the Internet service sequences; u represents the preference vector of the user for the Internet service; $item_{uj}$ represents the attribute vector for j Internet service in the user's Internet service sequences.

When the user has had network behavior dealings with one of the above Internet services, then the process of carrying out vectorized coding on the user preferences for the Internet services is, in one embodiment, the maximizing process $p(u, item_{uj})$. When the user has had network behaviors dealing with the Internet services in the entire Internet services sequence, then, in one embodiment, the process of carrying out vectorized coding on the user preferences for the Internet services is the process of maximizing formula (2) below. That is, the following formula (2) can be used as the optimization objective. Vectorized coding can be carried out on the user preferences for the Internet services to obtain the user preference vector for the Internet services, with the goal of maximizing the value of formula (2):

$$\sum_{j=1}^{t} p(u, item_{uj}) \tag{2}$$

In the above formula (2), u represents the user preference vector for the Internet service, $item_{uj}$ represents the attribute vector for the j Internet service in the user's Internet service sequence and t represents the total number of Internet services included in the Internet service sequence of the user.

In the process of solving the above formula (2), $$\frac{\partial f}{\partial u} = \sigma(\vec{u} \cdot \overrightarrow{item_{uj}})\left[1 - \sigma(\vec{u} \cdot \overrightarrow{item_{uj}})\right]\overrightarrow{item_{uj}}$$

can be obtained when $f-\sigma(u \cdot item_{uj})$ is set. On this basis, the process of updating the preference vector u of the user for the Internet services can be achieved by applying formula (3):

$$\overrightarrow{u_j} = \overrightarrow{u_{j-1}} + \eta \cdot \frac{\partial f}{\partial u} = \overrightarrow{u_{j-1}} + \eta \cdot \sigma(\vec{u} \cdot \overrightarrow{item_{uj}})\left[1 - \sigma(\vec{u} \cdot \overrightarrow{item_{uj}})\right]\overrightarrow{item_{uj}} \tag{3}$$

After the Internet service sequences of the users are processed according to the above process, the preference vector of each user for the Internet services can be obtained.

After obtaining the Internet service sequence, the preference vector for the Internet services, and the attribute vector for the Internet services, user preference scores for the candidate Internet service providers can be calculated in combination with the Internet services with user network behavior dealings, the Internet services provided by the candidate Internet service providers, the user preference vector for the Internet services and the user preference scores for the Internet service providers, and can be used to recommend potential users to the candidate Internet service providers based on the preference scores of the users for the Internet services.

In one embodiment, each user preference score for the candidate Internet service provider can be calculated according to formula (4) below:

$$Score(s, u) = \sum_{i=1}^{t} \delta(s, u, item_{ui}) \tag{4}$$

In the above formula (4), u represents the user preference vector for the Internet service; s represents the candidate Internet service provider; and Score(s, u) represents the user preference score for the candidate Internet service provider.

The equation, $$\delta(s, u, \overrightarrow{item_{ui}}) = \begin{cases} \cos(\vec{u}, \overrightarrow{item_{ui}}) & item_{ui} \in I_s \\ \alpha \cdot \cos(\vec{u}, \overrightarrow{item_{sf}}) \cdot \cos(\overrightarrow{item_{ui}}, \overrightarrow{item_{sf}}) & item_{ui} \notin I_s, item_{ui} \end{cases}$$

represents the attribute vector of the i Internet service in the user's Internet service sequence, and the attribute vectors of all Internet services in the user's Internet service sequence form a vector sequence, for example, $I_u = \{item_{u1}, item_{u2}, \ldots, item_{ut}\}$; $item_{sf}$ represents the attribute vector of the Internet service with the highest similarity to $item_{ut}$ in the Internet services provided by the candidate Internet service provider; t represents the total number of Internet services contained in the user's Internet service sequence; and $I_s$ represents the Internet service list provided by the candidate Internet service provider.

Each user preference score for the candidate Internet service provider can be calculated according to the above formula (4). Thereafter, potential users can be determined for candidate Internet service providers according to each user preference score for the candidate Internet service provider. In one embodiment, the higher the preference score, the higher the possibility that the user is a potential user for the candidate Internet service provider.

Figure 3:
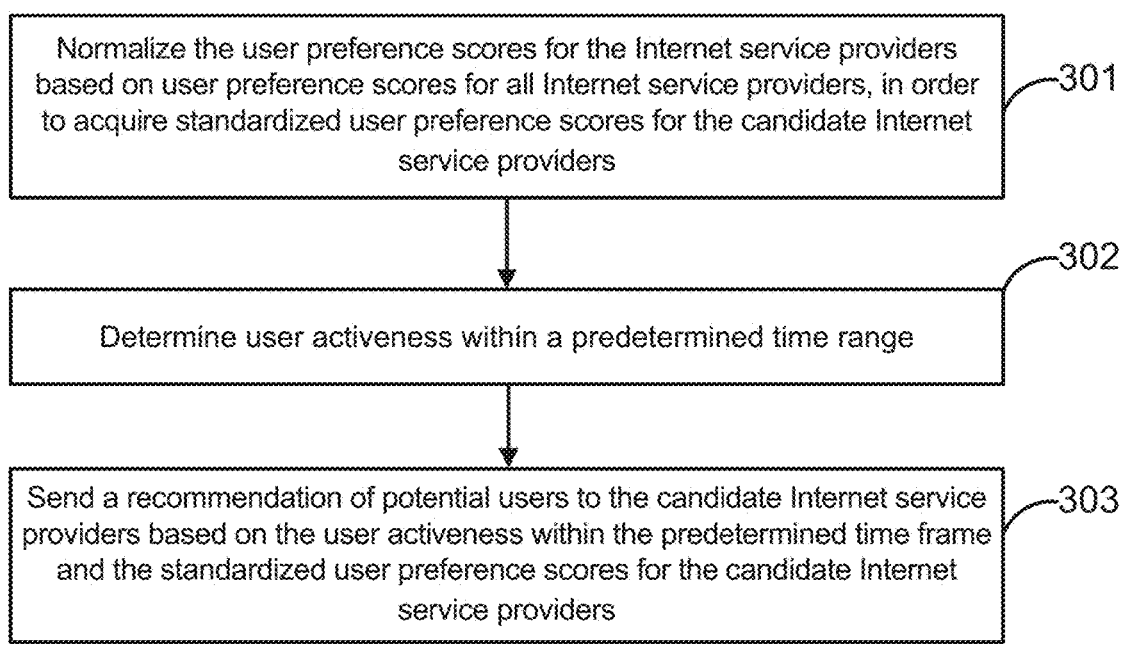
FIG. 3 illustrates a flow diagram of a method for recommending Internet service providers to a user according to one embodiment of the disclosure.

In one embodiment, sending a recommendation of potential users to candidate Internet service providers based on the user preference scores for the Internet service providers may further include the method illustrated in FIG. 3.

Considering that different users have different network behavior intensities, different users' preference scores for the same Internet service provider usually have little or no comparability among different users.

For a better comparison, in step 301, the method normalizes user scores for Internet service providers based on user preference scores for all Internet service providers, thereby converting them into the user preference probability (referred to as the standardized preference score) for Internet service providers, so that different standardized user preference scores for the same Internet service provider can be compared.

Based on this, a method for recommending potential users to the candidate Internet service providers according to the user preference scores for the Internet service providers comprises, in one embodiment, normalizing user preference scores for the candidate Internet service providers according to the user preference scores for all Internet service providers, in order to acquire standardized user preference scores for the candidate Internet service providers; and recommending potential users to the candidate Internet service providers according to the user preference scores for the Internet service providers.

One embodiment of a normalization method is shown in the following formula (5):

$$p(s_d | u) = \frac{Score(s_d, u)}{\sum_{i=1}^{N} Score(s_i, u)} \quad (5)$$

$p(s_d|u)$ represents the standardized user preference score for the candidate Internet service provider; $Score(s_i, u)$ represents the user preference score for the i Internet service provider; N represents the total number of Internet service providers; $s_d$ represents the candidate Internet service provider; and $Score(s_d, u)$ represents the user preference score for the candidate Internet service provider.

For example, some users with the highest-ranked standardized preference scores can be selected to be recommended to the candidate Internet service providers as potential users of the candidate Internet service providers, so as to recommend to the candidate Internet service providers after each standardized user preference score for the candidate Internet service provider is acquired. Alternatively, some users with standardized preference scores greater than the preset score threshold can also be selected to be recommended to the candidate Internet service providers as potential users of the candidate Internet service providers after each standardized user preference score for the candidate Internet service provider is acquired.

Furthermore, to recommend potential users with higher quality to the candidate Internet service providers, in addition to using standardized user preference scores for the candidate Internet service providers, the user activeness (e.g., degree of user activity) within a specific time range may optionally be combined.

If utilized, in step 302, the method determines the user activeness within a specific time range and, in step 303, recommends potential users to the candidate Internet service providers based on the user activeness within the predetermined time range and the standardized user preference scores for the candidate Internet service providers.

Optionally, the user activeness within a specific time range can be determined according to the number of Internet service detail pages visited by the user within a specific time range. In one embodiment, the greater the number of Internet service detail pages visited by the user, the higher the user activeness is; conversely, the fewer the number of Internet service detail pages visited by the user, the lower the user activeness is. The user activeness within a specific time range can be obtained specifically by the following formula:

$$active(u) = \log(pv) \quad (6)$$

In the above formula (6), active(u) represents the user activeness within a specific time range; and pv represents the number of Internet service detail pages visited by the user within a specific time range.

In one embodiment, recommending potential users to the candidate Internet service providers according to the user activeness within a specific time range and the standard user preference scores for the candidate Internet service providers comprises conducting numerical value processing for the user activeness within a specific time range and standardized user preference scores for the candidate Internet service providers, and acquiring the comprehensive user scores for the candidate Internet service providers; then, recommending potential users to the candidate Internet service providers according to the comprehensive user scores for the candidate Internet service providers. For example, some users with the highest-ranked comprehensive scores can be selected to be recommended to the candidate Internet service providers as potential users of the candidate Internet service providers, so as to recommend to the candidate Internet service providers. Alternatively, some users with comprehensive scores greater than the preset score threshold can be selected to be recommended to the candidate Internet service providers as potential users of the candidate Internet service providers.

In one embodiment, a method for calculating the comprehensive score is shown in the following formula:

$$S(s_d, u) = p(s_d | u) \cdot active(u) \quad (7)$$

In the above formula (7), $S(s_d, u)$ represents the comprehensive user score for the candidate Internet service provider, and corresponding descriptions in the above formulae can be referred to for the meanings of the other symbols.

For example, suppose the standardized preference score of user A for the Internet service provider S is 0.8, and the standardized preference score of user B for the Internet service provider S is 0.7, user A has the priority of being recommended to the Internet service provider S when compared with user B. However, in one embodiment the activeness of user A is less than that of user B; for example, the activeness of user A is 2, and the activeness of user B is 10, thus user B is more probable to be the potential user of Internet service provider S. The comprehensive score of user A for the Internet service provider S is 1.6, while the comprehensive score of user B for the Internet service provider S is 7, and the comprehensive score of user B is greater than the comprehensive score of user A; thus, user B needs to be recommended to the Internet service provider S first, which is beneficial for improving the quality of the potential user recommended to the Internet service provider S.

In one embodiment, the recommendation device acquires the user's Internet service sequence, the user preference vector for the Internet services, the attribute vector for the Internet services in the Internet service sequence, and Internet service lists provided by the Internet service providers according to user network behavior data for the Internet services in the network system within a specific time range; then, acquires the user preference scores for the candidate Internet service providers according to the user's Internet service sequence, the user preference vector for Internet services, the attribute vector for Internet services and the Internet service lists provided by the candidate Internet service providers to calculate any user preference score for the candidate Internet service provider. It is not specified that the users must be those who have had network behavior dealings with the Internet services provided by the candidate Internet service providers. Thereby, potential users can be recommended to the candidate Internet service providers according to the user preference scores for the Internet service providers, so as to ensure the quality of the recommended users. It is thus clear that the present disclosure can recommend more high-quality potential users to the Internet service providers, so as to increase user subscription.

It should be noted that the aforementioned embodiments are described as a combination of a series of actions; however, those skilled in the art should understand that the present disclosure is not limited by the described action sequence, as some steps can be carried out in other sequences or simultaneously according to the present application. Secondly, those skilled in the art should also understand that the embodiments described in the Specification are only preferred embodiments, and that the actions and modules involved are not absolutely required for the present disclosure.

In the above embodiments, the descriptions of various embodiments have different emphases, and for certain embodiments not described in detail, please refer to related descriptions of other embodiments.

Figure 4:
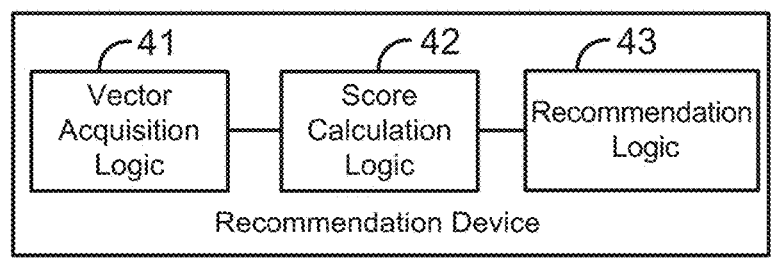
FIG. 4 illustrates a structure diagram of a recommendation device according to one embodiment of the disclosure.

FIG. 4 illustrates a structure diagram of a recommendation device provided in an embodiment of the present disclosure. As shown in FIG. 4, the device includes: vector acquisition logic 41, a score calculation logic 42, and a recommendation logic 43.

The vector acquisition logic 41 is used for acquiring the user's Internet service sequence, the user preference vector for the Internet services, the attribute vector for the Internet services in the Internet service sequence, and Internet service lists provided by the Internet service providers according to user network behavior data for the Internet services in a network system within a specific time range.

The score calculation logic 42 is used for acquiring the user preference scores for the candidate Internet service providers according to the user's Internet service sequence acquired by the vector acquisition logic 41, the user preference vector for the Internet services, the attribute vector for the Internet services and an Internet service list provided by the candidate Internet service provider.

The recommendation logic 43 is used for recommending potential users to the candidate Internet service providers according to the user preference scores acquired by the score calculation logic 42 for the Internet service providers.

In one embodiment, the vector acquisition logic 41 can be specifically used for gathering statistics on the user network behavior data generated when the user accesses the Internet services within a specific time range, so as to obtain the user's Internet service sequence according to the time sequence of network behavior occurrences; carrying out vectorized coding on the attribute information of the Internet services to obtain the attribute vector for the Internet services according to the user's Internet service sequence; carrying out vectorized coding on user preferences for the Internet services to obtain the user preference vector for the Internet services according to the user's Internet service sequence and the attribute vector for the Internet services.

Furthermore, the vector acquisition logic 41, when carrying out vectorized coding on the attribute information of the Internet services to obtain the attribute vector for the Internet services according to the user's Internet service sequence, can be specifically used for carrying out vectorized coding on the attribute information of the Internet services to obtain the attribute vector for the Internet services, with the goal of maximizing the value of formula (1); The description related to formula (1) is included in the aforesaid embodiment, therefore it will not be repeated herein.

Furthermore, the vector acquisition logic 41, when carrying out vectorized coding on user preferences for the Internet services to obtain the user preference vector for the Internet services according to the user's Internet service sequence and the attribute vector for the Internet services, can be specifically used for carrying out vectorized coding on the user preferences for the Internet services to obtain the user preference vector for the Internet services, with the goal of maximizing the value of formula (2); The description related to formula (2) is included in the aforesaid embodiment, therefore it will not be repeated herein.

In one embodiment, the score calculation logic 42 can be specifically used for: calculating the user preference score for each candidate Internet service provider according to the formula (4). The description related to formula (4) is included in the aforesaid embodiment, therefore it will not be repeated herein for the sake of clarity.

In one embodiment, the recommendation logic 43 can be specifically used for: normalizing user preference scores for the candidate Internet service providers according to the user preference scores for all Internet service providers, in order to acquire the standardized user preference scores for the candidate Internet service providers; and recommending potential users to the candidate Internet service providers according to the user preference scores for the Internet service providers.

Furthermore, the recommendation logic 43, when recommending potential users to the candidate Internet service providers according to the user preference scores for the Internet service providers, can be specifically used for acquiring user activeness within a specific time range; and recommending potential users to the candidate Internet service providers according to the user activeness within a specific time range and the standardized user preference scores for the candidate Internet service providers.

Furthermore, the recommendation logic 43, when acquiring user activeness within a specific time range, can be specifically used for: determining the user activeness within a specific time range according to the number of Internet service detail pages visited by users within a specific time range.

In one embodiment, the Internet service may be a shopping service, for example, where commodities are provided for the users to purchase via the network system; accordingly, the Internet service provider can be an online store or a merchant.

It is worthwhile to note that the users in the network system of the present embodiment comprise those who have not been associated with or have not had any direct network behavior associated with the candidate Internet service providers; certainly, the users can also comprise those who have been associated with or have had direct network behaviors associated with the candidate Internet service providers. That is to say, the users in the present application can be from any user group in the network system.

The recommendation device provided by the present embodiment can acquire the user's Internet service sequence, the user preference vector for the Internet services, the attribute vector for the Internet services in the Internet service sequence, and Internet service lists provided by the Internet service providers according to the user network behavior data for the Internet services in the network system within a specific time range; then, acquire the user preference scores for the candidate Internet service providers according to the user's Internet service sequence, the user preference vector for the Internet services, the attribute vector for the Internet services and the Internet service list provided by the candidate Internet service provider to calculate any user preference score for the candidate Internet service provider. It is not specified that the users must be those who have had network behavior dealings with the Internet services provided by the candidate Internet service providers. Thus, potential users can be recommended to the candidate Internet service providers according to the user preference scores for the Internet service providers, so as to ensure the quality of the recommended users. Therefore, the recommendation device provided by the present embodiment can recommend more high-quality potential users to the Internet service providers, so as to increase user subscription.

Those skilled in the art can clearly understand that, for convenient and concise description, the above-mentioned corresponding method embodiments can be referred to for specific working processes of the aforementioned system, device and units, therefore they will not be repeated herein.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

In several embodiments provided by the present disclosure, it should be understood that the disclosed system, device and method can be realized by other means. For instance, the above-mentioned device embodiments are only schematic, e.g., the allocation of the units is only a logical and functional allocation, and in practical applications, the units can be allocated in different ways, e.g., multiple units or modules can be combined or integrated with another system, or some features can be omitted, or not executed. Another point is that, mutual coupling, direct coupling or communication connection displayed or discussed can be realized through indirect coupling or communication connection through some interfaces, devices or units, and can be electrical, mechanical or in other forms.

The units described as a separating component may or may not be separated physically. The component may or may not be physical units, e.g., they may be located in one position, or they may be distributed on multiple network units. Some or all units therein may be selected to achieve the purpose of the present embodiment according to actual requirements.

Moreover, the functional units or modules in each embodiment of the present disclosure may be integrated into one processing unit, or they may physically exist independently, or two or more units may be integrated into one unit. The units may be integrated in the form of hardware, and may also be integrated in the form of hardware with software functional units.

The units integrated in the form of a software functional unit may be stored in a computer-readable storage medium. The aforementioned software functional unit is stored in a storage medium, including a number of commands so that a computer device (which can be a personal computer, a server, or a network device, etc.) or processor can execute the steps of the method described in each embodiment of the present application. The storage medium includes various mediums such as a USB disk, mobile hard disk, Read-Only Memory (ROM), Random Access Memory (RAM), diskette or optical disk, of which can be used for storing program codes.

In one embodiment, it should be noted that the above embodiments are provided merely for describing the technical schemes of the present disclosure, and are not to limit the present disclosure. Although the present disclosure with reference to the above-mentioned embodiments has been described in detail, those skilled in the art should understand that modifications can be made to the technical schemes of the above-mentioned embodiments, or equivalent replacements to some technical features can be provided therein; however, the essence of these modifications or replacements cannot be construed to depart from the spirit and scope of the technical schemes of each embodiment of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method for recommending users to an Internet service provider, the method comprising:
    retrieving, by a processor, a log of user behavior data with Internet services provided by Internet service providers using a network system, the user behavior data comprising network interactions received from users of the Internet services;
    building, by the processor, a user's Internet service sequence based on the log of user behavior by identifying a sequence of Internet services included in the log during a predefined time period, the Internet service sequence organized as a time sequence of network behavior occurrences;
    building, by the processor, a user preference vector for Internet services based on executing vectorized coding on user preference data associated with the Internet services, the user preference data comprising an amount of interactions with each Internet service, and
    building, by the processor, an attribute vector for Internet services identified in the user's Internet service sequence by executing vectorized coding on attribute information associated with each of the Internet services identified in the user's Internet service sequence;
    calculating, by the processor, user preference scores for one or more candidate Internet service providers, wherein the user preferences scores are calculated based on the user's Internet service sequence, the user preference vector for the Internet services, the attribute vector for the Internet services, and Internet service lists provided by the candidate Internet service providers; and
    sending a recommendation, by the processor, of potential users to the candidate Internet service providers based on the user preference scores for the candidate Internet service providers.

2. The method according to claim 1, wherein executing vectorized coding on the attribute information associated with each of the Internet service identified in the user's Internet service sequence comprises:
    maximizing value of formula $$\prod_{w \in C} p(w \mid context(w)),$$

wherein,
    w represents the Internet service in the user's Internet service sequence;
    context(w) represents context of the Internet service in the user's Internet service sequence;
    p(w|context(w)) represents conditional probability of the Internet service; and
    C represents a set of Internet service sequences comprising the Internet service in the user's Internet service sequence.

3. The method according to claim 1, wherein executing vectorized coding on the user preference data associated with the Internet services comprises:
    maximizing value of formula $$\sum_{j=1}^{t} p(u, item_{uj});$$

wherein, $$p(u, item_{uj}) = \frac{1}{1 + e^{-u^T item_{uj}}},$$

and wherein
    u represents the user preference vector for the Internet service;
    $item_{uj}$ represents the attribute vector for j Internet service in the user's Internet service sequence;
    t represents a total number of Internet services included in the user's Internet service sequence; and
    $p(u, item_{uj})$ represents user preference for the j Internet service.

4. The method according to claim 1, wherein calculating user preference scores for one or more Internet service providers, wherein the user preferences scores are calculated based on the user's Internet service sequence, the user preference vector for the Internet services, the attribute vector for the Internet services, and the Internet service lists provided by the candidate Internet service providers comprises:
    calculating the user preference score for a candidate Internet service provider based on the formula $$Score(s, u) = \sum_{i=1}^{t} \delta(s, u, item_{ui});$$

$$\delta(s, u, item_{ui}) = \begin{cases} \cos(\vec{u}, \vec{item_{ui}}) & item_{ui} \in I_s \\ \alpha \cdot \cos(\vec{u}, \vec{item_{sf}}) \cdot \cos(\vec{item_{ui}}, \vec{item_{sf}}) & item_{ui} \notin I_s, \end{cases}$$

wherein,
    u represents the user preference vector for the Internet service;

s represents the Internet service provider;

Score(s,u) represents the user preference score for the Internet service provider;

$item_{ui}$ represents the attribute vector for the i Internet service in the user's Internet service sequence;

$item_{sf}$ represents the attribute vector for the Internet service that is most similar to $item_{ui}$ in the Internet services provided by the Internet service provider;

t represents a total number of the Internet services included in the user's Internet service sequence; and $I_s$ represents the Internet service list provided by the Internet service provider.

5. The method according to claim 1, wherein sending a recommendation of potential users to candidate Internet service providers based on the user preference scores for the Internet service providers comprises:

normalizing the user preference scores for the Internet service providers based on user preference scores for all Internet service providers, in order to acquire standardized user preference scores for the candidate Internet service providers; and sending a recommendation of potential users to the candidate Internet service providers based on the standardized user preference scores for the candidate Internet service providers.

6. The method according to claim 5, wherein sending a recommendation of potential users to candidate Internet service providers according to the standardized user preference scores comprises:

determining user activeness within a predetermined time range; and sending a recommendation of the potential users to the candidate Internet service providers based on the user activeness within the predetermined time range and the standardized user preference scores for the candidate Internet service providers.

7. The method according to claim 6, wherein acquiring user activeness within a predetermined time range comprises determining the user activeness within the predetermined time range based on one or more Internet service detail pages visited by the user within the predetermined time range.

8. The method according to claim 1, wherein the user is one of a plurality of users comprising users who have not previously been associated with or have not had any direct network behavior associated with the Internet service providers.

9. A recommendation device comprising:

a processor;

a storage medium for tangibly storing thereon program logic for execution by the processor, the program logic comprising:

vector acquisition logic executed by the processor for retrieving a log of user behavior data with Internet services provided by Internet service providers using a network system, the user behavior data comprising network interactions received from users of the Internet services, building a user's Internet service sequence based on the log of user behavior by identifying a sequence of Internet services included in the log during a predefined time period, the Internet service sequence organized as a time sequence of network behavior occurrences, building a user preference vector for Internet services based on executing vectorized coding on user preference data associated with the Internet services, the user preference data comprising an amount of interactions with each Internet service, and building an attribute vector for Internet services identified in the user's Internet service sequence by executing vectorized coding on attribute information associated with each of the Internet services identified in the user's Internet service sequence;

score calculation logic executed by the processor for calculating user preference scores for one or more candidate Internet service providers, wherein the user preferences scores are calculated based on the user's Internet service sequence, the user preference vector for the Internet services, and the attribute vector for the Internet services, and Internet service lists provided by the candidate Internet service providers; and recommendation logic executed by the processor for sending a recommendation of potential users to the candidate Internet service providers based on the user preference scores for the candidate Internet service providers.

10. The device according to claim 9, wherein the vector acquisition logic further comprises:

logic for maximizing the value of formula $$\prod_{w \in C} p(w \mid context(w));$$

wherein w represents an Internet service in the user's Internet service sequence;

context(w) represents a context of the Internet service in the user's Internet service sequence, p(w|context(w)) represents a conditional probability of the Internet service; and C represents a set of Internet service sequences that includes the Internet service in the user's Internet service sequence.

11. The device according to claim 9, wherein the vector further comprises:

logic for maximizing the value of formula $$\sum_{j=1}^{t} p(u, item_{uj});$$

wherein, $$p(u, item_{uj}) = \frac{1}{1 + e^{-u^T item_{uj}}},$$

and wherein u represents the user preference vector for an Internet service;

$item_{uj}$ represents the attribute vector for j Internet service in the user's Internet service sequence;

t represents a total number of the Internet services included in the user's Internet service sequence; and $p(u,item_{uj})$ represents a user preference for the j Internet service.

12. The device according to claim 9, wherein the score acquisition logic further comprises:
user preference score calculating logic executed by the processor for calculating the user preference score for a candidate Internet service provider based on the formula $$Score(s, u) = \sum_{i=1}^{t} \delta(s, u, item_{ui});$$

wherein, $$\delta(s, u, item_{ui}) = \begin{cases} \cos(\vec{u}, \overrightarrow{item_{ui}}) & item_{ui} \in I_s \\ \alpha \cdot \cos(\vec{u}, \overrightarrow{item_{sf}}) \cdot \cos(\overrightarrow{item_{ui}}, \overrightarrow{item_{sf}}) & item_{ui} \notin I_s, \end{cases}$$

u represents the user preference vector for an Internet service provided by the Internet service provider;
s represents the Internet service provider;
Score(s,u) represents the user preference score for the Internet service provider;
$item_{ui}$ represents the attribute vector for the i Internet service in the user's Internet service sequence;
$item_{sf}$ represents the attribute vector for the Internet service that is most similar to $item_{ui}$ in the Internet services provided by the Internet service provider;
t represents a total number of the Internet services included in the user's Internet service sequence; and
$I_s$ represents the Internet service list provided by the Internet service provider.

13. The device according to claim 9, wherein the recommendation logic further comprises:
normalizing logic executed by the processor for normalizing the user preference scores for the Internet service providers based on the user preference scores for all Internet service providers, in order to acquire standardized user preference scores for the candidate Internet service providers;
potential user recommending logic executed by the processor for sending a recommendation of potential users to the candidate Internet service providers based on the standardized user preference scores for the candidate Internet service providers.

14. The device according to claim 13, wherein the recommendation logic further comprises:
user activeness acquiring logic executed by the processor for determining user activeness within a predetermined time range;
wherein the potential user recommending logic further comprises logic for sending a recommendation of the potential users to the candidate Internet service providers based on the user activeness within the predetermined time range and the standardized user preference scores for the candidate Internet service providers.

15. The device according to claim 14, wherein the user activeness acquiring logic further comprises detail page determining logic executed by the processor for determining the user activeness within the predetermined time range based on a number of Internet service detail pages visited by the user within the predetermined time range.

16. The device according to claim 9, wherein the user is one of a plurality of users comprising users who have not previously been associated or have had any direct network behavior dealings with the Internet service providers.

17. A non-transitory computer readable storage medium tangibly storing computer program instructions capable of being executed by a computer processor, the computer program instructions defining the steps of:
retrieving, by a processor, a log of user behavior data with Internet services provided by Internet service providers using a network system, the user behavior data comprising network interactions received from users of the Internet services;
building, by the processor, a user's Internet service sequence based on the log of user behavior by identifying a sequence of Internet services included in the log during a predefined time period, the Internet service sequence organized as a time sequence of network behavior occurrences;
building, by the processor, a user preference vector for Internet services based on executing vectorized coding on user preference data associated with the Internet services, the user preference data comprising an amount of interactions with each Internet service;
building, by the processor, an attribute vector for Internet services identified in the user's Internet service sequence by executing vectorized coding on attribute information associated with each of the Internet services identified in the user's Internet service sequence;
calculating, by the processor, user preference scores for one or more candidate Internet service providers, wherein the user preferences scores are calculated based on the user's Internet service sequence, the user preference vector for the Internet services, the attribute vector for the Internet services, and Internet service lists provided by the candidate Internet service providers; and
sending a recommendation, by the processor, of potential users to candidate Internet service providers based on the user preference scores for the candidate Internet service providers.

* * * * *